United States Patent [19]

Anchia

[11] Patent Number: 4,724,689
[45] Date of Patent: Feb. 16, 1988

[54] THEFT PROOF LOCK FOR LICENSE PLATES

[76] Inventor: Sergio O. Anchia, 1400 NW. 34th Ave., Miami, Fla. 33125

[21] Appl. No.: 882,298

[22] Filed: Jul. 7, 1986

[51] Int. Cl.$^4$ ............................................. E05B 73/00
[52] U.S. Cl. ........................................... 70/58; 70/232; 70/258
[58] Field of Search ........................ 70/14, 57, 58, 258, 70/DIG. 57, 229, 230, 231, 232; 40/201, 202, 209

[56] References Cited

U.S. PATENT DOCUMENTS

| | | | |
|---|---|---|---|
| 2,763,076 | 9/1956 | Neely | 40/202 |
| 2,878,663 | 3/1959 | Smith | 70/14 |
| 3,434,312 | 3/1969 | Buchman | 70/14 |
| 3,637,180 | 1/1972 | Parry | 70/57 |
| 4,441,344 | 4/1984 | Kurpershock | 70/258 |

Primary Examiner—Robert L. Wolfe

[57] ABSTRACT

A locking device to prevent the theft or loss of the vehicles license plates, that is easily attachable requiring no special skills or tools to be installed; comprising a novel bracket designed to be attached by bolt through one of the openings provided for that purpose in the license plate into the vehicle embodiment, therefore sandwiching the license plate between said bracket and the vehicle embodiment. Means for locking is a modified slide-in type cylindrical lock that when engaged with said bracket in locked position will prevent the access to said attaching bolt, therefore making impossible the removal of the license plate from the vehicle without the locking device key.

3 Claims, 5 Drawing Figures

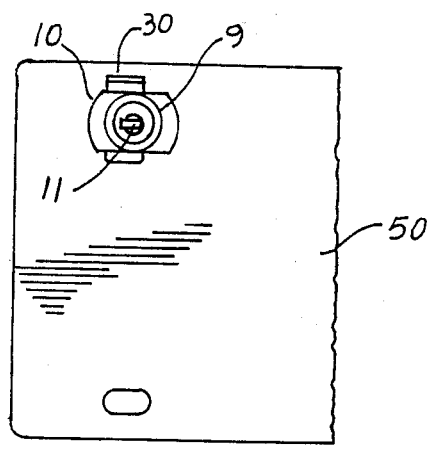
FIG-1-
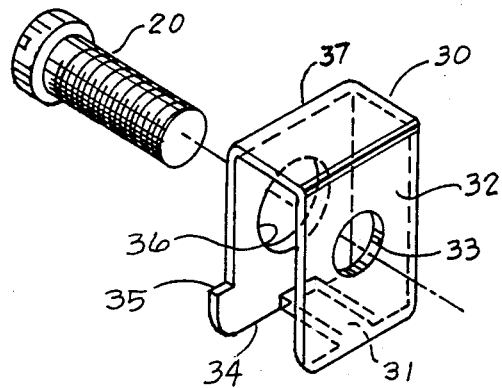
FIG-2-
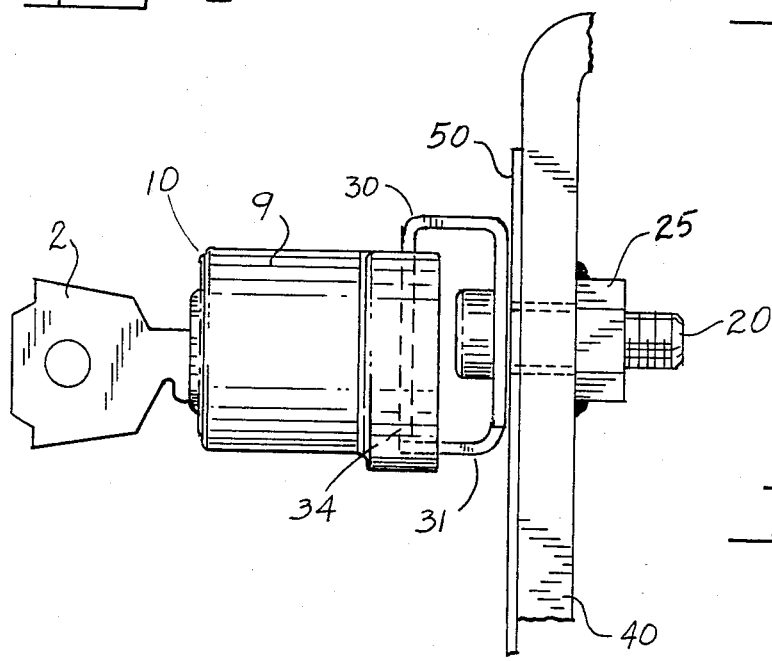
FIG-3-
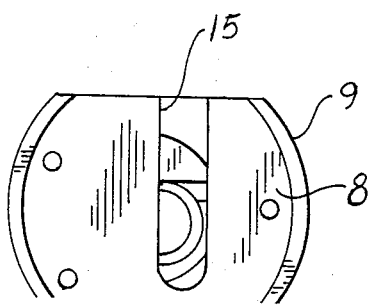
FIG-4-
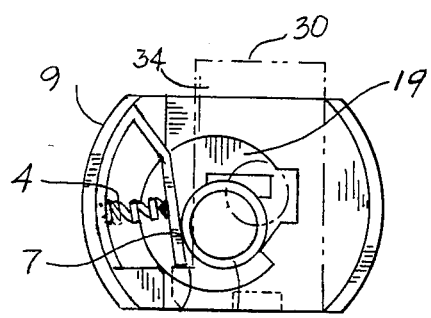
FIG-5-

THEFT PROOF LOCK FOR LICENSE PLATES

BACKGROUND OF THE INVENTION

1. Field of the Invention

The present invention relates to locking devices, and more particularly, to a locking device to protect vehicle license plates from being removed by unauthorized persons.

2. Description of the Prior Art

Usually, license plates are fastened to motor vehicles simply by bolt and nut assemblies which, of course, are readily removable. The unauthorized removal of license plates to accomplish illegal purposes, or simply confusing enforcement authorities, constitutes a compounding problem today.

One attempt to solve this problem is disclosed in U.S. Pat. No. 2,201,519, issued to Buehner, however, there is not enough room in today's vehicles license plate area to permit the use of Buehner's device. The present invention has the feature of positioning itself on top of the bolt being protected, which cannot be accomplished with Buehner's invention.

In U.S. Pat. No. 2,878,663, issued to V.C. Smith on July 20, 1956, disclosed a locking device for sliding door panels that uses a lock unit of the same type used by me as one of the members in the locking device of my invention, and also discloses an elongated flat bar with a plurality of teeth along an outer edge and has a hook portion at one end, having a relative "U" shape, however, Smith's device is intended for use in locking sliding door panels and cannot physically be used as a license plate locking device without the modification incorporated by me to the back cover plate of said lock unit, and that makes possible its engagement with a novel bracket invented by me, which is the main feature of the present invention.

SUMMARY OF THE INVENTION

It is the main purpose of the present invention to provide a device for protecting license plates for vehicles that may be easily installed without requiring physical modifications of the license plate or the supporting member in which said plates are attached.

Another objective of the present invention is to provide such a device that may be inexpensively manufactured.

It is another purpose of the present invention to provide a theft proof locking device that may be easily installed on all kinds of makes of vehicles requiring license plates.

Further objectives of the present invention will be brought out in the following part of the specifications, wherein detailed description is for the purpose of fully disclosing the invention without placing limitations thereon.

BRIEF DESCRIPTIONS OF THE DRAWINGS

With the above and other related objectives in view, the invention consists in the details of construction and combination of parts as will be more fully understood from the following description, when read in conjunction with the accompanying drawing in which:

FIG. 1 is a fragmentary front view of a license plate incorporating the present invention.

FIG. 2 illustrates the bracket, instant prospective, and a bolt showing a way it is installed.

FIG. 3 represents an enlarged side view of the locking device and it is intended to show the relative position of the different components.

FIG. 4 is a bottom view of a modified slide-in type lock unit, showing the incorporated slot in its back cover plate.

FIG. 5 is the same bottom view of the slide-in type lock unit shown in FIG. 4 but with its back cover plate removed and showing the notched side of the bracket in phantom.

DESCRIPTION OF THE PREFERRED EMBODIMENT

Referring to FIG. 1 where the theft proof locking device has been referred to generally by number 10, it may be observed that the only exposed components of this device are the lock unit 9 and sides 31 and 37 FIG. 2 of bracket 30, it can also be observed that the present device has been designed to be installed by means of an attaching bolt 20 FIG. 3 through one of the openings ready provided in all license plates at any of its corners, therefore, the view of all numbers and letters will not be obstructed, and will not be interfering with any part of the vehicle embodiment.

In FIG. 2 we can see bracket 30 which is integrally built in one piece unit, having four flat sides and forming a substantially rectangular shape. Side 34 is provided with notch 35 in an outer edge for locking when engaged with the lock unit 9 and comes in contact with lever 7 FIG. 5, said side 34 is also provided with an opening 36 to allow the attaching bolt 20 to pass free throughout said saide 34. Side 32 is provided with a second opening 33 in center to center alignment with said opening 36 in side 34, but of a similar diameter to allow only the threaded part of the attaching bolt 20 to pass through but preventing its head from passing throughout said side 32 by stopping it when it comes in contact with the inner wall of side 32, while bracket 30 is being attached in place. Side 31 has a narrower width dimension than the other sides of bracket 30 to allow lock 9 to be inserted into side 31 through slot 15 FIG. 4, lock 9 will stop in locked position when the end of slot 15 comes in contact with side 31. Side 37 would complete the rectangular shape of bracket 30, giving it the solid strength of a one-piece unit, therefore preventing the forced opening of bracket 30 by bending out side 34 with lock 9 engaged in locked position and exposing the head of the attaching bolt 20, thereby forfeiting the intended function of the present invention.

In FIG. 3 we can appreciate the relative position of bracket 30 with respect to lock 9 which is actuated by key 2 in the conventional manner, lock 9 is shown engaged with bracket 30 in a locked position, thereby blocking the access to the attaching bolt 20 which is compressing side 32 of bracket 30 and license plate 50 to the vehicle embodiment 40 by the action of tightening bolt 20 into threaded assembly 25, as the result license plate 50 would be sandwiched between bracket 30 and vehicle embodiment 40, without making necessary any alteration of the mentioned components.

In FIG. 4 we can see a bottom view of lock 9 showing its back cover plate 8, to which I had incorporated the slot 15 that therefore will allow lock 9 to be slided through side 31 of bracket 30 FIG. 2, and that will stop in locked position when the end of slot 15 comes in contact with side 31 of bracket 30.

In FIG. 5 we can see the same bottom view of FIG. 4 but with the lock 9 back cover plate 8 removed and side 34 of bracket 30 (shown in phantom) in locked position, as it can be seen notch 35 in side 34 is locked in place by the action of cooperating locking lever 7 which is biased by spring 4 against notched edge 35, therefore locking lever 7 is preventing lock 9 from sliding out of side 34 of bracket 30 until key 2 FIG. 3 actuates key plug 19 to which actuator 5 is rigidly attached, when key plug 19 rotates by having the proper key 2 to actuate on the corresponding configuration of tumblers pins (not shown), then the actuator 5 rotates passing lever 7 away from notched edge 35 leaving the lock 9 free to be slid out of bracket 30.

It is believed that the foregoing description conveys the best understanding of the objectives and advantages of the present invention. Different embodiments may be made of the inventive concept of this invention. It is to be understood that all matter disclosed herein is to be interpreted merely as illustrative, and not in limiting sense, except as set forth in the following appended claims.

What is claimed is:

1. An attachment device including a lock for locking a vehicle license plate, comprising: a bracket having four flat sides which are integrally built in one piece forming a substantially rectangular shape, having a front side with a notched portion along an outer edge for locking when engaged with said lock comprising a casing having a bore therein and a slot extending transversely of and intersecting a portion of said bore whereby only one edge of said slot is disposed on a line extending across said bore, said one edge having a recess therein, said slot being adapted to slidably received said front side of said bracket with the notch thereon adjacent said one edge of the slot and therefore extending across the bore and said recess, a key plug mounted to rotate in said bore and having an eccentric locking stud projecting in an axial direction from the inner end thereof into said recess whereby said stud is normally out of the path of said notch when the key plug is in unlocked position, said locking stud being movable into engagement with said notch upon rotation of said key plug to locked position to thereby secure the lock to said bracket, locked position means preventing access to said bracket and a license plate attaching bolt, said front side having an opening with a diameter big enough to allow said attaching bolt to pass free throughout said front side and into a second opening located in a back side of said bracket and in center to center alignment with said front side opening but having a smaller diameter to allow only a threaded portion of said attaching bolt to pass through said second opening and stopping said attaching bolt head portion when it comes in contact said back side of said bracket therefore preventing said attaching bolt from passing throughout said back side of said bracket, attaching bolt means for securing said bracket and said license plate to vehicle, a bottom side of said bracket having a narrower width dimension to slidably receive said lock to which a recessed slot in its back cover has been incorporated for engagement with said bottom side of said bracket and stopping said lock in locked position means when said back cover slot recess comes in contact with said bottom side of said bracket stopping said lock blocking access to said attaching bolt securing said attachment device.

2. The device set forth in claim 1 wherein the means for locking is the front side of said bracket having a notched portion along an outer edge adapted to be engaged and disengaged with said lock by a relative sliding movement.

3. The device set forth in claim 1 wherein the means for slidably receive and stop said lock in locked position is the said bottom side of said bracket having a narrower width dimension.

* * * * *